(12) United States Patent
Dreossi

(10) Patent No.: US 10,544,967 B2
(45) Date of Patent: Jan. 28, 2020

(54) HEAT PUMP ARRANGEMENT FOR DOMESTIC APPLIANCE

(71) Applicant: ELECTROLUX APPLIANCES AKTIEBOLAG, Stockholm (SE)

(72) Inventor: Giuseppe Dreossi, Stockholm (SE)

(73) Assignee: Electrolux Appliances Aktiebolaget, Stockholm (SE)

( * ) Notice: Subject to any disclaimer, the term of this patent is extended or adjusted under 35 U.S.C. 154(b) by 209 days.

(21) Appl. No.: 15/307,565

(22) PCT Filed: Jun. 2, 2014

(86) PCT No.: PCT/EP2014/061340
§ 371 (c)(1),
(2) Date: Oct. 28, 2016

(87) PCT Pub. No.: WO2015/185086
PCT Pub. Date: Dec. 10, 2015

(65) Prior Publication Data
US 2017/0051953 A1    Feb. 23, 2017

(51) Int. Cl.
*D06F 39/00* (2006.01)
*D06F 33/02* (2006.01)
(Continued)

(52) U.S. Cl.
CPC .......... *F25B 30/02* (2013.01); *A47L 15/0047* (2013.01); *A47L 15/4285* (2013.01); *A47L 15/4287* (2013.01); *A47L 15/4291* (2013.01); *D06F 33/02* (2013.01); *D06F 37/304* (2013.01); *D06F 39/006* (2013.01); *D06F 39/045* (2013.01); *F25B 49/025* (2013.01);
(Continued)

(58) Field of Classification Search
None
See application file for complete search history.

(56) References Cited

U.S. PATENT DOCUMENTS 5,220,258 A * 6/1993 Hans .................. H02P 6/14
                                                    318/400.09
6,560,980 B2 * 5/2003 Gustafson ............. F25B 49/02
                                                    62/179

FOREIGN PATENT DOCUMENTS

CH    701 685 A2    2/2011
CN    1804489 A     7/2006
(Continued)

OTHER PUBLICATIONS

International Preliminary Report on Patentability/Written Opinion for International Application No. PCT/EP2014/061340 dated Dec. 15, 2016.
(Continued)

*Primary Examiner* — Rita P Adhlakha
(74) *Attorney, Agent, or Firm* — Alston & Bird LLP

(57) ABSTRACT

Provided herein is a domestic appliance for washing goods that may include a washing compartment for receiving goods to be washed, and a heat pump arrangement, adapted to heat washing liquid to be used in the washing compartment. The heat pump arrangement may include an evaporator arranged to collect heat from ambient air, and a condenser arranged to dissipate heat to the washing liquid to thereby heat the washing liquid. The heat pump arrangement may further include a variable speed fan arranged to force the ambient air through the evaporator.

15 Claims, 1 Drawing Sheet

(51) Int. Cl.
- *A47L 15/00* (2006.01)
- *F25B 30/02* (2006.01)
- *A47L 15/42* (2006.01)
- *D06F 37/30* (2006.01)
- *D06F 39/04* (2006.01)
- *F25B 49/02* (2006.01)

(52) U.S. Cl.
CPC ...... *A47L 2401/12* (2013.01); *F25B 2600/111* (2013.01); *F25B 2700/2104* (2013.01); *F25B 2700/21161* (2013.01)

(56) References Cited

FOREIGN PATENT DOCUMENTS

| | | |
|---|---|---|
| CN | 1957831 A | 5/2007 |
| CN | 102209486 A | 10/2011 |
| CN | 102905603 A | 1/2013 |
| CN | 103070656 A | 5/2013 |
| CN | 203447255 U | 2/2014 |
| DE | 43 30 456 C1 | 3/1995 |
| EP | 2 460 927 A1 | 6/2012 |
| EP | 2 682 039 A1 | 1/2014 |
| FR | 2 059 693 A1 | 6/1971 |
| JP | 2007 117556 A | 5/2007 |
| JP | 2009247458 A | 10/2009 |
| JP | 2009268577 A | 11/2009 |
| WO | WO 2013/090443 A1 | 6/2013 |

OTHER PUBLICATIONS

International Search Report for Application No. PCT/EP2014/061340 dated Mar. 23, 2015.

Office Action for Chinese Application No. 201480078661.4 dated Aug. 20, 2018.

Office Action for Chinese Application No. 201480078661.4 dated Jul. 5, 2019, 11 pages.

Office Action for Chinese Application No. 201480078661.4 dated Mar. 28, 2019.

* cited by examiner

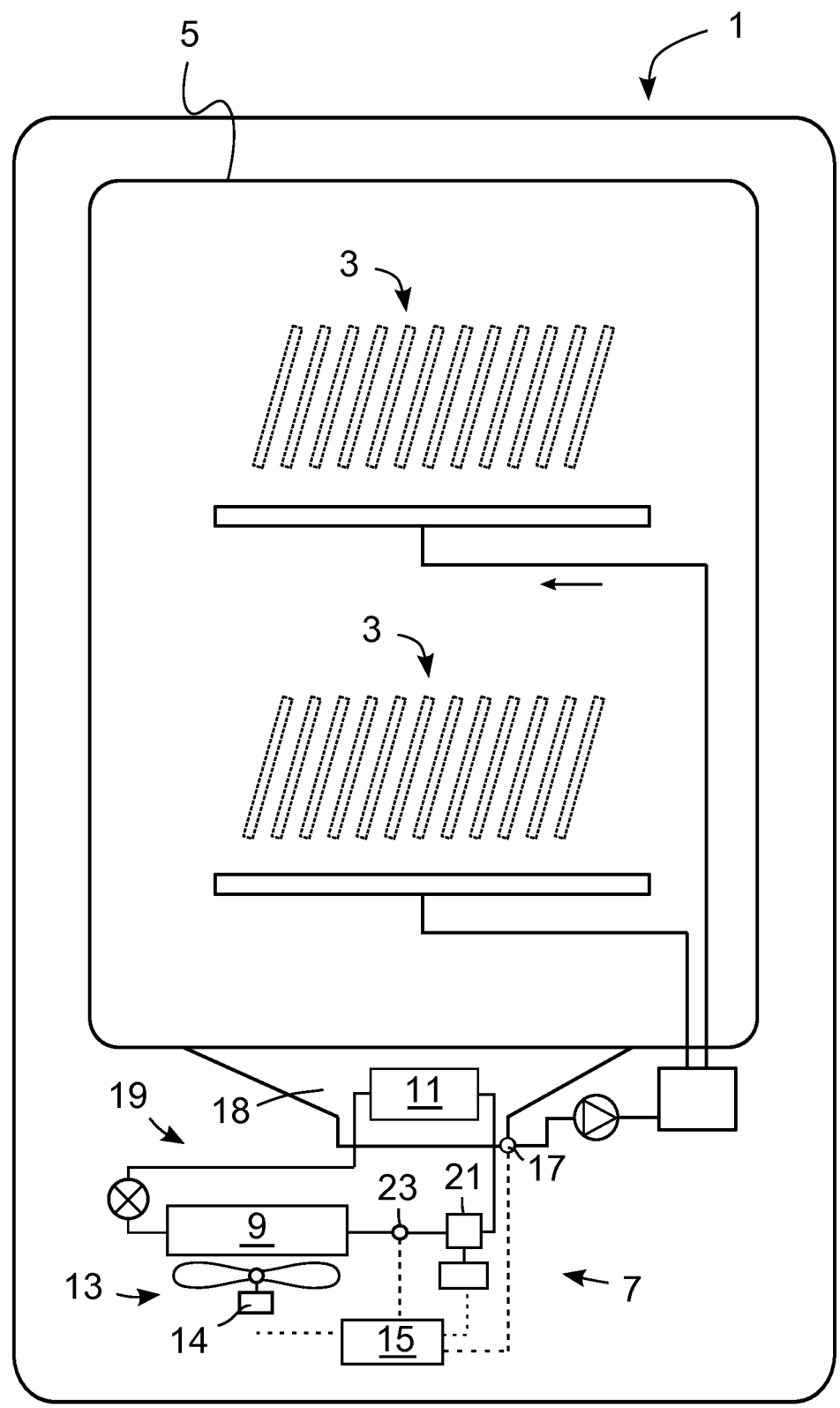

HEAT PUMP ARRANGEMENT FOR DOMESTIC APPLIANCE

CROSS-REFERENCE TO RELATED APPLICATIONS

This application is a national stage application filed under 35 U.S.C. § 371 of International Application No. PCT/EP2014/061340 filed Jun. 2, 2014, which application is hereby incorporated by reference in its entirety.

TECHNICAL FIELD

The present disclosure relates to a domestic appliance.

BACKGROUND

Today's domestic appliances for washing goods, such as washing machines and dishwashers, are expected to perform a high quality wash of goods. In addition, environmental concerns require an efficient use of energy during a wash session. The requirement of performing a high quality wash of goods and the requirement of efficient use of energy during a wash session can be seen as two conflicting requirements. As commonly known, washing fluid in a domestic appliance has to have a certain temperature to be able to perform a wash of goods with a proper quality. In domestic appliances known in the art, washing liquid is heated using electrical heating elements. In order to reduce the amount of electrical energy required during a wash session, without compromising the quality of the washing process, it has been suggested to use a heat pump arrangement to heat washing liquid in a domestic appliance. The use of such a heat pump arrangement is for example described in the document EP 2682039 A1. However, in view of the arrangement disclosed in the document EP 2682039 A1, there is room for improvements with regards to the energy efficiency.

In the light of the above, there is a need for a domestic appliance allowing for an efficient use of energy during operation thereof.

SUMMARY

An object of the present disclosure is to provide a domestic appliance allowing for an efficient use of energy during operation thereof.

According to an aspect of the present disclosure, the object is achieved by a domestic appliance for washing goods, comprising a washing compartment for receiving goods to be washed, and a heat pump arrangement, adapted to heat washing liquid to be used in the washing compartment, the heat pump arrangement comprising an evaporator arranged to collect heat from ambient air, a condenser arranged to dissipate heat to the washing liquid to thereby heat the washing liquid, wherein the heat pump arrangement further comprises a variable speed fan arranged to force the ambient air through the evaporator.

Since the heat pump arrangement further comprises a variable speed fan arranged to force the ambient air through the evaporator, an amount of ambient air forced through the evaporator can be regulated. Accordingly, a domestic appliance is provided allowing for an efficient use of energy during operation thereof.

As a result, the above mentioned object is achieved.

Optionally, the variable speed fan comprises a brushless direct current electric motor. A brushless direct current electric motor has better energy efficiency than a traditional electric motor having brushes and it is easier to control the speed of such a motor. Thereby, by using a brushless direct current electric motor, a domestic appliance 1 is provided allowing for an efficient use of energy during operation thereof, both since the motor per se requires less energy during use and since a speed of the variable speed fan 13 can be controlled in manner such that the domestic appliance uses inputted energy more efficiently.

Optionally, the heat pump arrangement further comprises a control unit arranged to control a speed of the variable speed fan between at least two different speeds.

Optionally, the domestic appliance further comprises a first sensor arranged to sense a washing liquid temperature of the washing liquid and where the control unit is arranged to control the speed of the variable speed fan in response to the washing liquid temperature. Thereby, a domestic appliance is provided allowing for an even further efficient use of energy during operation thereof.

Optionally, the control unit is arranged to control the speed of the variable speed fan to a higher speed in case the washing liquid temperature is below a washing liquid temperature threshold value than in case the washing liquid temperature is above the washing liquid temperature threshold value. Thereby, a domestic appliance is provided allowing for an even further efficient use of energy during operation thereof.

Optionally, the first sensor is further arranged to, in a start-up phase of a wash cycle of the domestic appliance, sense a first sensor start-up temperature representative of at least one of a temperature of an environment external to the domestic appliance or a washing liquid temperature of washing liquid from a preceding wash cycle, and where the control unit is further arranged to control the speed of the variable speed fan in response to the first sensor start-up temperature. Thereby, a domestic appliance is provided allowing for an even further efficient use of energy during operation thereof.

Optionally, the control unit is arranged to control the speed of the variable speed fan to a higher speed in case the first sensor start-up temperature is below a first sensor start-up temperature threshold value than in case the first sensor start-up temperature is above the first sensor start-up temperature threshold value. Thereby, a domestic appliance is provided allowing for an even further efficient use of energy during operation thereof.

Optionally, the heat pump arrangement comprises a heat pump circuit comprising the evaporator, the condenser and a compressor arranged to compress refrigerant fluid in the heat pump circuit, where the domestic appliance further comprises a second sensor arranged to sense a compressor suction temperature of the refrigerant fluid in the heat pump circuit at a position upstream the compressor and downstream the evaporator, where the control unit is arranged to control the speed of the variable speed fan in response to the compressor suction temperature. Thereby, a domestic appliance is provided allowing for an even further efficient use of energy during operation thereof.

Optionally, the control unit is arranged to control the speed of the variable speed fan to a higher speed in case the compressor suction temperature is below a compressor suction temperature threshold value than in case the compressor suction temperature is above the compressor suction temperature threshold value. Thereby, a domestic appliance is provided allowing for an even further efficient use of energy during operation thereof.

Optionally, the control unit is arranged to drive the variable speed fan at the higher speed during at least a predetermined time as long as the compressor suction temperature is below the compressor suction temperature threshold value, and where the control unit is further arranged to stop the compressor in case the compressor suction temperature is below the compressor suction temperature threshold value after the predetermined time. Thereby, a domestic appliance is provided allowing for an even further efficient use of energy during operation thereof.

Optionally, the second sensor is further arranged to, in a start-up phase of a wash cycle of the domestic appliance, sense a second sensor start-up temperature representative of a temperature of an environment external to the domestic appliance, and where the control unit is further arranged to control the speed of the variable speed fan in response to the second sensor start-up temperature. Thereby, a domestic appliance is provided allowing for an even further efficient use of energy during operation thereof.

Optionally, the control unit is arranged to control the speed of the variable speed fan to a higher speed in case the second sensor start-up temperature is below a second sensor start-up temperature threshold value than in case the second sensor start-up temperature is above the second sensor start-up temperature threshold value. Thereby, a domestic appliance is provided allowing for an even further efficient use of energy during operation thereof.

BRIEF DESCRIPTION OF THE DRAWINGS

The various aspects of the present disclosure, including its particular features and advantages, will be readily understood from the following detailed description and the accompanying drawings, in which:

FIG. 1 illustrates a domestic appliance for washing goods.

DETAILED DESCRIPTION

Domestic appliances herein will now be described more fully with reference to the accompanying drawings, in which varieties are shown. Disclosed features of examples may be combined as readily understood by one of ordinary skill in the art. Like numbers refer to like elements throughout. Well-known functions or constructions will not necessarily be described in detail for brevity and/or clarity.

FIG. 1 illustrates a domestic appliance 1 for washing goods 3. In the example embodiment shown in FIG. 1, the domestic appliance 1 is illustrated as a dishwasher. However, the domestic appliance 1 may also be a washing machine.

The domestic appliance 1 comprises a washing compartment 5 for receiving goods 3 to be washed, and a heat pump arrangement 7 adapted to heat washing liquid to be used in the washing compartment 5. The heat pump arrangement 7 comprises an evaporator 9 arranged to collect heat from ambient air and a condenser 11 arranged to dissipate heat to the washing liquid to thereby heat the washing liquid. The heat pump arrangement 7 further comprises a variable speed fan 13 arranged to force the ambient air through the evaporator 9.

Since the heat pump arrangement 7 further comprises a variable speed fan 13 arranged to force the ambient air through the evaporator 9, a domestic appliance 1 allowing for an efficient use of energy during operation thereof is provided since the amount of ambient air forced through the evaporator 9 can be regulated.

The variable speed fan may 13 comprise a brushless direct current electric motor 14. A brushless direct current electric motor has better energy efficiency than a traditional electric motor with brushes and it is easier to control the speed of a brushless direct current electric motor 14. Thereby, by using a brushless direct current electric motor 14, a domestic appliance 1 is provided allowing for an efficient use of energy during operation thereof, both since the motor 14 per se requires less energy during use and since a speed of the variable speed fan 13 can be controlled in manner such that the domestic appliance uses inputted energy more efficiently.

The heat pump arrangement 7 may comprise a control unit 15 arranged to control a speed of the variable speed fan 13 between at least two different speeds.

The domestic appliance 1 may further comprise a first sensor 17 arranged to sense a washing liquid temperature $T_{WL}$ of the washing liquid. The control unit 15 may be arranged to control the speed of the variable speed fan 13 in response to the sensed washing liquid temperature $T_{WL}$.

The control unit 15 may be arranged to control the speed of the variable speed fan 13 to a higher speed in case the washing liquid temperature $T_{WL}$ is below a washing liquid temperature threshold value $T_{WLTV}$ than in case the washing liquid temperature $T_{WL}$ is above the washing liquid temperature threshold value $T_{WLTV}$. Thereby, heat exchange between ambient air and the washing liquid can be optimized. Also, in case of a washing liquid temperature $T_{WL}$ being above the washing liquid temperature threshold value $T_{WLTV}$, the variable speed fan 13 will be driven at a lower speed and will thus require less electrical driving energy. Due to these features, a domestic appliance 1 allowing for an efficient use of energy during operation thereof is provided.

Further, the control unit 15 may be arranged to perform a step-less control of the speed of the variable speed fan 13 in response to the washing liquid temperature $T_{WL}$.

The washing liquid temperature threshold value $T_{WLTV}$ may be dependent on, or similar to, a washing liquid temperature that is desired during a wash cycle. The washing liquid temperature threshold value $T_{WLTV}$ may for example be 30, 40, 60, or 90 degrees Centigrade.

The first sensor 17 may further be arranged to sense, in a start-up phase of a wash cycle of the domestic appliance 1, a first sensor start-up temperature $T_{S-U1}$ representative of at least one of a temperature $T_E$ of an environment external to the domestic appliance 1 or a washing liquid temperature $T_{WL}$ of washing liquid from a preceding wash cycle. The control unit 15 is further arranged to control the speed of the variable speed fan 13 in response to the first sensor start-up temperature $T_{S-U1}$. As illustrated in FIG. 1, the first sensor 17 may be arranged in a sump 18 of the household appliance 1. In a start-up phase of a wash cycle, washing liquid from a preceding wash cycle will, if sufficient time has elapsed since the preceding wash cycle, have reached a thermic equilibrium with the environment external to the domestic appliance 1. Accordingly, the first sensor start-up temperature $T_{S-U1}$ sensed by sensor 17 will, if sufficient time has elapsed since a preceding wash cycle, be representative of a temperature $T_E$ of an environment external to the domestic appliance 1, or a washing liquid temperature $T_{WL}$ of washing liquid from a preceding wash cycle, if sufficient time has not elapsed since a preceding wash cycle. In both cases, the variable speed fan 13 can be controlled, by the control unit 15 in a more energy efficient manner.

The control unit 15 may be arranged to control the speed of the variable speed fan 13 to a higher speed in case the first sensor start-up temperature $T_{S-U1}$ is below a first sensor start-up temperature threshold value $T_{S-UTV1}$ than in case the first sensor start-up temperature $T_{S-U1}$ is above the first sensor start-up temperature threshold value $T_{S-UTV1}$.

Further, the control unit 15 may be arranged to perform a step-less control the speed of the variable speed fan 13 in response to the first sensor start-up temperature $T_{S-U1}$.

Since the domestic appliance 1 is intended to be used in a room-environment shared with humans, it is likely that temperature $T_E$ of an environment external to the domestic appliance 1 will vary between approximately 15 and 25 degrees Centigrade.

In case the sensed first sensor start-up temperature $T_{S-U1}$ is low, for example 15 degrees Centigrade, the sensed first sensor start-up temperature $T_{S-U1}$ is assumed to be representative of the environment external to the domestic appliance 1 and the control unit 15 will control the variable speed fan to a high speed to thereby increase heat exchange between ambient air and the washing liquid.

In case the sensed first sensor start-up temperature $T_{S-U1}$ is high, for example 50 degrees Centigrade, the sensed first sensor start-up temperature $T_{S-U}$ is assumed to be representative of a washing liquid temperature $T_{WL}$ of washing liquid from a preceding wash cycle. Here, the control unit 15 will control the variable speed fan 13 to a lower speed to thereby reduce the amount of electrical energy used by the motor 14 of the variable speed fan 13.

As a result, a domestic appliance 1 is provided allowing for an efficient use of energy during operation thereof.

The heat pump arrangement 7 illustrated in FIG. 1 comprises a heat pump circuit 19 comprising an evaporator 9, a condenser 11 and a compressor 21 arranged to compress refrigerant fluid in the heat pump circuit 19. Also, the domestic appliance 1 further comprises a second sensor 23 arranged to sense a compressor suction temperature $T_{CS}$ of the refrigerant fluid in the heat pump circuit 19 at a position upstream the compressor 21 and downstream the evaporator 9. Further, the control unit 15 may be arranged to control the speed of the variable speed fan 13 in response to the compressor suction temperature $T_{CS}$.

The control unit 15 may be arranged to control the speed of the variable speed fan 13 to a higher speed in case the compressor suction temperature $T_{CS}$ is below a compressor suction temperature threshold value $T_{CSTV}$ than in case the compressor suction temperature $T_{CS}$ is above the compressor suction temperature threshold value $T_{CSTV}$.

If the compressor suction temperature $T_{CS}$ is low, it may indicate that the evaporator 9 not is evaporating refrigerant fluid properly. This may be caused by an ice build-up on evaporator fins of the evaporator 9. The compressor suction temperature threshold value $T_{CSTV}$ may be adapted to the point in which ice build-up can be assumed. Also, the compressor suction temperature threshold value $T_{CSTV}$ may be adapted to a temperature in which it can be assumed that the evaporator 9 is not evaporating refrigerant fluid properly. At such a temperature, refrigerant fluid will be in liquid state when reaching the compressor 21 instead of being in gaseous form, as is intended to be the case during normal operation of the heat pump arrangement 7. Thus, the compressor suction temperature threshold value $T_{CSTV}$ may be dependent on the refrigerant fluid used, especially the boiling point of the refrigerant fluid used, and on an intended working pressure in the heat pump circuit 19. The compressor suction temperature threshold value $T_{CSTV}$ may for example be minus 5 degrees Centigrade.

The control unit 15 may be arranged to drive the variable speed fan 13 at the higher speed during at least a predetermined time as long as the compressor suction temperature $T_{CS}$ is below the compressor suction temperature threshold value. The control unit 15 is further arranged to stop the compressor 21 in case the compressor suction temperature $T_{CS}$ is below the compressor suction temperature threshold value $T_{CSTV}$ after the predetermined time. The described procedure may be referred to as a defrosting procedure. The higher speed during at least a predetermined time is intended to result in a melting of ice that has been built up on evaporator fins of the evaporator 9.

When such ice has melted, it will result in an increase in compressor suction temperature $T_{CS}$ of the refrigerant fluid. However, if this does not occur, i.e. if the compressor suction temperature $T_{CS}$ is below the compressor suction temperature threshold value $T_{CSTV}$ even after the predetermined time, the control unit 15 will stop the compressor 21. Thereby, the compressor 21 is protected from being damaged.

The predetermined time may for example be in the range of 1-2 minutes

The second sensor 23 may be further arranged to, in a start-up phase of a wash cycle of the domestic appliance 1, sense a second sensor start-up temperature $T_{S-U2}$ representative of a temperature $T_E$ of an environment external to the domestic appliance 1. The control unit 15 may be further be arranged to control the speed of the variable speed fan 13 in response to the second sensor start-up temperature $T_{S-U2}$.

Further, the control unit 15 may be arranged to perform a step-less control the speed of the variable speed fan 13 in response to the second sensor start-up temperature $T_{S-U2}$.

The control unit 15 may be arranged to control the speed of the variable speed fan 13 to a higher speed in case the second sensor start-up temperature $T_{S-U2}$ is below a second sensor start-up temperature threshold value $T_{S-UTV2}$ than in case the second sensor start-up temperature $T_{S-U2}$ is above the second sensor start-up temperature threshold value $T_{S-UTV2}$.

The second sensor 23 is arranged to sense a compressor suction temperature $T_{CS}$ of the refrigerant fluid in the heat pump circuit 19 at a position upstream the compressor 21 and downstream the evaporator 9. In a start-up phase of a wash cycle, refrigerant fluid in the heat pump circuit 19, at a position upstream the compressor 21 and downstream the evaporator 9, can be assumed to have reached a thermic equilibrium with the environment external to the domestic appliance 1. Thereby, the second sensor 23 can also be used to sense a second sensor start-up temperature $T_{S-U2}$ representative of a temperature $T_E$ of an environment external to the domestic appliance 1. By sensing the second sensor start-up temperature $T_{S-U2}$, the variable speed fan 13 can be controlled, by the control unit 15, in a more energy efficient manner.

Since the domestic appliance 1 is intended to be used in a room-environment shared with humans, it is likely that temperature $T_E$ of an environment external to the domestic appliance 1 will vary between approximately 15 and 25 degrees Centigrade.

In case the sensed second sensor start-up temperature $T_{S-U2}$ is low, for example 15 degrees Centigrade, the control unit 15 will control the variable speed fan to a high speed to thereby increase heat exchange between the ambient air and the washing liquid.

In case the sensed second sensor start-up temperature $T_{S-U2}$ is high, for example 25 degrees Centigrade, the control unit 15 will control the variable speed fan 13 to a lower speed to thereby reduce the amount of electrical energy used by the motor 14 of the variable speed fan 13.

As a result, a domestic appliance 1 is provided allowing for an efficient use of energy during operation thereof.

The control unit 15 may be arranged to control the speed of the variable speed fan 13 in response to a combination of the sensed first sensor start-up temperature $T_{S-U1}$ and the sensed second sensor start-up temperature $T_{S-U2}$. In such embodiments, the control unit 15 may be arranged to control the speed of the variable speed fan 13 in response to the lowest temperature of the of the sensed first sensor start-up temperature $T_{S-U1}$ and the sensed second sensor start-up temperature $T_{S-U2}$.

It is to be understood that the foregoing is illustrative of various examples and the present disclosure is not to be limited to the specific varieties disclosed and that modifications to the disclosed examples, combinations of features of disclosed examples as well as other varieties are intended to be included within the scope of the appended claims.

The invention claimed is:

1. A domestic appliance for washing goods, comprising;
    a washing compartment for receiving goods to be washed, and
    a heat pump arrangement, adapted to heat washing liquid to be used in said washing compartment, said heat pump arrangement comprising:
    an evaporator configured to collect heat from ambient air;
    a condenser configured to dissipate heat to said washing liquid to thereby heat said washing liquid, wherein the heat pump arrangement further comprises;
    a variable speed fan configured to force said ambient air through said evaporator; and
    a control unit configured to control a speed of said variable speed fan,
    wherein said domestic appliance further comprises a first sensor configured to sense a washing liquid temperature ($T_{WL}$) of said washing liquid, and wherein said control unit is configured to control said speed of said variable speed fan in response to said washing liquid temperature ($T_{WL}$).

2. The domestic appliance according to claim 1, where said variable speed fan comprises a brushless direct current electric motor.

3. The domestic appliance according to claim 1, where the control unit is configured to control a speed of said variable speed fan between at least two different speeds.

4. The domestic appliance according to claim 1, where said control unit is configured to control said speed of said variable speed fan to a higher speed in case said washing liquid temperature ($T_{WL}$) is below a washing liquid temperature threshold value ($T_{WLTV}$) than in case said washing liquid temperature ($T_{WL}$) is above said washing liquid temperature threshold value ($T_{WLTV}$).

5. The domestic appliance according to claim 4, where said heat pump arrangement comprises a heat pump circuit comprising said evaporator, said condenser and a compressor configured to compress refrigerant fluid in said heat pump circuit, where said domestic appliance further comprises a second sensor configured to sense a compressor suction temperature ($T_{CS}$) of said refrigerant fluid in said heat pump circuit at a position upstream said compressor and downstream said evaporator, where said control unit is configured to control said speed of said variable speed fan in response to said compressor suction temperature ($T_{CS}$).

6. The domestic appliance according to claim 5, where said control unit is configured to control said speed of said variable speed fan to a higher speed in case said compressor suction temperature ($T_{CS}$) is below a compressor suction temperature threshold value ($T_{CSTV}$) than in case said compressor suction temperature ($T_{CS}$) is above said compressor suction temperature threshold value.

7. Said domestic appliance according to claim 6, where said control unit is configured to drive said variable speed fan at said higher speed during at least a predetermined time as long as said compressor suction temperature ($T_{CS}$) is below said compressor suction temperature threshold value, and where said control unit is further configured to stop said compressor in case said compressor suction temperature ($T_{CS}$) is below said compressor suction temperature threshold value ($T_{CSTV}$) after said predetermined time.

8. The domestic appliance according to claim 5, where said second sensor is further configured to, in a start-up phase of a wash cycle of said domestic appliance, sense a second sensor start-up temperature ($T_{S-U2}$) representative of a temperature ($T_E$) of an environment external to said domestic appliance, and where said control unit is further configured to control said speed of said variable speed fan in response to said second sensor startup temperature ($T_{S-U2}$).

9. The domestic appliance according to claim 8, where said control unit is configured to control said speed of said variable speed fan to a higher speed in case said second sensor start-up temperature ($T_{S-U2}$) is below a second sensor start-up temperature threshold value ($T_{S-UTV2}$) than in case said second sensor start-up temperature ($T_{S-U2}$) is above said second sensor start-up temperature threshold value ($T_{S-UTV2}$).

10. The domestic appliance according to claim 8, wherein said control unit is further configured to control said speed of said variable speed fan in response to said first sensor start-up temperature ($T_{S-U1}$) and said second sensor start-up temperature ($T_{S-U2}$).

11. The domestic appliance according to claim 8, wherein said control unit is further configured to control said speed of said variable speed fan in response to a lowest temperature between said first sensor start-up temperature ($T_{S-U1}$) and said second sensor start-up temperature ($T_{S-U2}$).

12. The domestic appliance according to claim 1, where said first sensor is further configured to, in a start-up phase of a wash cycle of said domestic appliance, sense a first sensor start-up temperature ($T_{S-U1}$) representative of at least one of a temperature ($T_E$) of an environment external to said domestic appliance, or a washing liquid temperature ($T_{WL}$) of washing liquid from a preceding wash cycle, and where said control unit is further configured to control said speed of said variable speed fan in response to said first sensor start-up temperature ($T_{S-U1}$).

13. The domestic appliance according to claim 12, where said control unit is configured to control said speed of said variable speed fan to a higher speed in case said first sensor start-up temperature ($T_{S-U1}$) is below a first sensor start-up temperature threshold value ($T_{S-UTV1}$) than in case said first sensor start-up temperature ($T_{S-U1}$) is above said first sensor start-up temperature threshold value ($T_{S-UTV1}$).

14. The domestic appliance according to claim 1, wherein the first sensor is disposed within a sump of the washing compartment, such that the first sensor is configured to be submerged in washing liquid in said sump during at least a portion of a wash cycle.

15. The domestic appliance according to claim 1, where said first sensor is further configured to, in a start-up phase of a wash cycle of said domestic appliance, sense a washing liquid temperature (TWL) of washing liquid from a preceding wash cycle, and where said control unit is further configured to control said speed of said variable speed fan in response to said washing liquid temperature (TWL).

* * * * *

UNITED STATES PATENT AND TRADEMARK OFFICE
CERTIFICATE OF CORRECTION

| | | |
|---|---|---|
| PATENT NO. | : 10,544,967 B2 | Page 1 of 1 |
| APPLICATION NO. | : 15/307565 | |
| DATED | : January 28, 2020 | |
| INVENTOR(S) | : Dreossi | |

It is certified that error appears in the above-identified patent and that said Letters Patent is hereby corrected as shown below:

On the Title Page

Item (73) Assignee: "Electrolux Appliances Aktiebolaget" should read --Electrolux Appliances Aktiebolag--.

Signed and Sealed this
Thirty-first Day of March, 2020

Andrei Iancu
*Director of the United States Patent and Trademark Office*